Patented Aug. 1, 1933

1,920,345

UNITED STATES PATENT OFFICE 1,920,345

FOG PENETRATING APPARATUS

Carl Biernat, Glasford, Ill.

Application January 14, 1931, Serial No. 508,693
Renewed April 15, 1933

2 Claims. (Cl. 88—1.)

This invention relates to a fog penetrating apparatus enabling persons to see for a considerable distance through fog, rain, snow, and it is the principal object of my invention to provide a device which can conveniently and quickly be attached to a front part of a moving vehicle, such as for instance the windshield of an automobile.

Another object of my invention is the provision of a device of this character equipped with a movable lens readily adjustable to suit the eyesight of the operator.

A further object of my invention is the provision of such an apparatus of compact, simple and inexpensive construction, yet durable and highly efficient in its operation.

A still further object of my invention is the provision of a device of this type equipped with suction cups for quickly attaching the device to a smooth surface.

These and other objects and advantages of my device will become more fully known as the description thereof proceeds, and will then be specifically defined in the appended claims.

In the accompanying drawing forming a material part of this disclosure:

Figure 1:
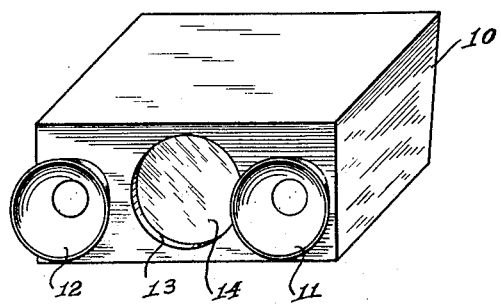
Fig. 1 is a perspective view of a fog penetrating apparatus constructed according to my invention.
Figure 2:
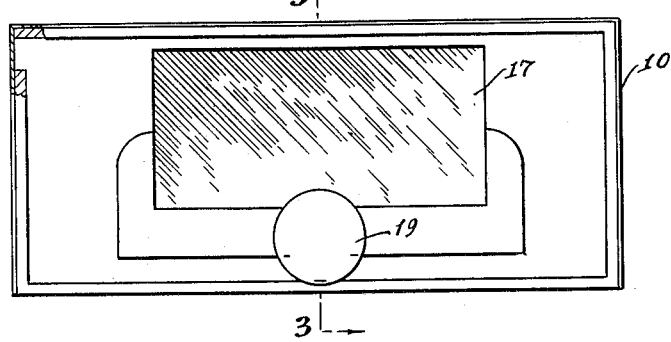
Fig. 2 is an inner rear view of the same.
Figure 3:
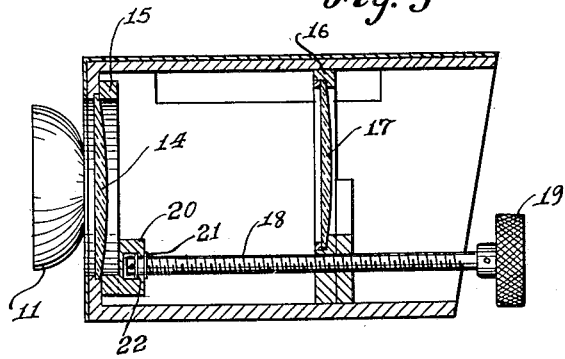
Fig. 3 is a cross-section on line 3—3 of Figure 2.

As illustrated the apparatus comprises a box 10 of any suitable size or material equipped at its front wall, with a pair of rubber suction cups 11 and 12 by means of which the apparatus can be attached to any smooth surface, as for instance the windshield of an automobile.

Between the cups the front wall has a window 13 formed therein in which a lens 14 is held by means of its frame 15.

A movable frame 16 for a lens 17 is arranged within box 10 behind lens 14 at a distance therefrom, and a screw 18 is passed through the lower part of frame 16 and carries at its outer end an operating knob 19, while its inner end is rotatably held in a suitable bearing 20 engaging between two collars 21, 22, on the screw.

In operation, it will be clear that in thick weather as dense fog or the like, the instrument can be readily attached by means of the suction cups to a smooth surface as for instance a window, or the wind-shield of a car and the lens 17 in its frame can be brought closer to lens 14 or be distanced therefrom to suit the eyesight of the operator and the weather conditions, so that a clear image of the conditions in front of the operator is obtained for a considerable distance.

It will be understood that I may make such changes in my device as come within the scope of the appended claims without departure from my invention.

Having thus described my invention what I claim as new and desire to secure by Letters Patent is:

1. A fog penetrating apparatus comprising a box, suction cups at one of the walls of said box to attach the same to a smooth surface, said wall having a window, a lens held within said window, a movable frame in said box distanced from said window, a lens held in said frame, and a means for bringing said lens in the movable frame into proper focus.

2. A fog penetrating apparatus comprising a box, suction cups at one of the walls of said box to attach the same to a smooth surface, said wall having a window, a lens held in said window, a movable frame in said box, a lens held in said frame, a screw, a means for holding the inner end of said screw, and an operating knob at the outer end of said screw for operating said screw for properly focusing the lenses.

CARL BIERNAT.